United States Patent [19]

Negri et al.

[11] Patent Number: 5,704,951
[45] Date of Patent: Jan. 6, 1998

[54] MIXTURES OF BLUE-DYEING FIBER-REACTIVE DYES AND THEIR USE FOR DYEING HYDROXY-AND/OR CARBOXAMIDO-CONTAINING FIBER MATERIAL

[75] Inventors: Daniele Negri, Busto Arsizio, Italy; Andreas Von Der Eltz, Frankfurt am Main, Germany; Werner Hubert Russ, Flörsheim, Germany; Bengt-Thomas Gröbel, Niederems, Germany

[73] Assignee: Hoechst Aktiengesellschaft, Germany

[21] Appl. No.: 626,634

[22] Filed: Apr. 1, 1996

[30] Foreign Application Priority Data

Mar. 30, 1995 [DE] Germany .................. 195 11 689.5

[51] Int. Cl.$^6$ .................. C09B 62/00; C06P 1/384
[52] U.S. Cl. .................. 8/546; 8/549; 8/641; 8/686; 8/687; 8/681
[58] Field of Search .................. 8/549, 638, 641, 8/682, 685, 6, 687, 546

[56] References Cited

U.S. PATENT DOCUMENTS 5,071,442  12/1991  Luttringer et al. .
5,456,727  10/1995  Heimling et al. .

FOREIGN PATENT DOCUMENTS 2132480   3/1995   Canada .
0437184   7/1991   European Pat. Off. .
0644240   3/1995   European Pat. Off. .
0668328   8/1995   European Pat. Off. .
0679697  11/1995   European Pat. Off. .

OTHER PUBLICATIONS

Database WPI; Section Ch, Week 8344; Derwent Publications Ltd., London, GB; Class A60, AN 83–80433; Sep. 22, 1983.

Primary Examiner—Margaret Einsmann
Attorney, Agent, or Firm—Connolly and Hutz

[57] ABSTRACT

A solid or dissolved dye mixture of azo dyes having fiber-reactive groups of the vinyl sulfone series, yielding dyeings of blue color shade, comprising one or more copper formazane dyes of the general formula (1) shown and defined in claim 1, one or more disazo dyes of the general formula (2) shown and defined in claim 1, and one or two monoazo dyes of the general formula (3) shown and defined in claim 1, respectively in the description part of the patent application, which dye mixtures are suitable for dyeing hydroxy- and/or caroboxamido groups containing materials, in particular fiber materials, such as cellulose fibers, for example cotton, wool and synthetic polyamide fibers, also together with other suitable dyes in trichromatic dyeing.

7 Claims, No Drawings

MIXTURES OF BLUE-DYEING FIBER-REACTIVE DYES AND THEIR USE FOR DYEING HYDROXY-AND/OR CARBOXAMIDO-CONTAINING FIBER MATERIAL

DESCRIPTION

Mixtures of blue-dyeing fiber-reactive dyes and their use for dyeing hydroxy- and/or carboxamido-containing fiber material The invention is in the technical field of fiber-reactive dyes.

The efforts at widening or supplementing the ranges of dyes by means of modern reactive dyes reach, in many respects, limits which can only be overcome insufficiently, if at all, by means of an individual dye component. Dark blue reactive dyes frequently give rise to difficulties in trichromatic dyeing since either their fiber affinity is too high or the dyes are exhausted too rapidly or, for example in the case of copper formazan dyes, do not show sufficient liquor exhaustion. Accordingly, the problem was to find suitable blue-dyeing reactive dyes which exhibit a good balance of their fiber affinity and their exhaustion behavior.

According to the present invention, this object is achieved by the mixtures of dyes having the formulae (1), (2) and (3) as given and defined below, which have now been found.

The present invention provides dye mixtures containing one or more, such as two or three, copper formazan dyes of the formula (1), one or more, such as two, three or four, disazo dyes of the formula (2), and one or two monoazo dyes of the formula (3).

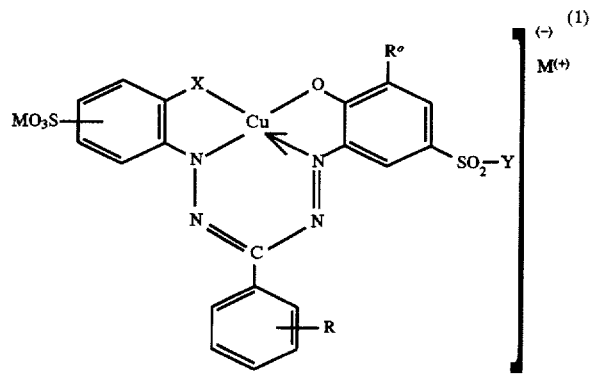

(1)

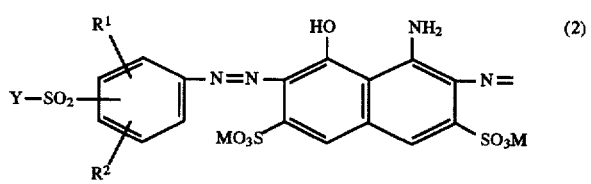

(2)

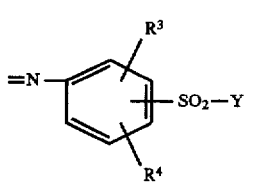

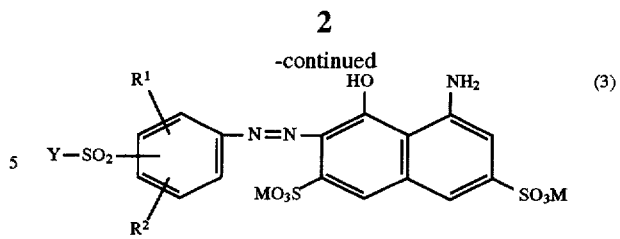

(3)

In these formulae, $R^0$ is hydrogen or sulfo,

Y is vinyl, β-chloroethyl, β-thiosulfatoethyl or β-sulfatoethyl, preferably vinyl, and in particular β-sulfatoethyl, R is hydrogen, alkyl of 1 to 4 carbon atoms, such as methyl or ethyl, sulfo, carboxy, alkanoyl of 2 to 5 carbon atoms, such as propionyl or acetyl, or a group of the formula —$SO_2$—Y where Y has one of the meanings given above, and preferably it is hydrogen or sulfo, X is carbonyloxy of the formula —CO—O— or oxy of the formula —O— or is the group —$SO_3^{(-)}$, preferably carbonyloxy, M is hydrogen or an alkali metal, such as lithium, sodium and potassium, $R^1$ is hydrogen, methyl, ethyl, methoxy or ethoxy, preferably methoxy and hydrogen, and in particular hydrogen, $R^2$ is hydrogen, methyl, ethyl, methoxy or ethoxy, preferably hydrogen, $R^3$ is hydrogen, methyl, ethyl, methoxy or ethoxy, preferably methoxy and hydrogen, and in particular hydrogen, $R^4$ is hydrogen, methyl, ethyl, methoxy or ethoxy, preferably hydrogen.

The individual formula members in formulae (1), (2) and (3) can, within their definition, have meanings which are identical to or different from one another.

A sulfo group is a group of the formula —$SO_3M$, a carboxy group is a group of the formula —COOM, a sulfato group is a group of the formula —$OSO_3M$, and a thiosulfato group is a group of the formula —S—$SO_3M$ where M has in each case the meaning given above.

The dyes of the formulae (1), (2) and (3) are disclosed, for example, in German Patents 960,534 and 965,902 and U.S. Pat. No. 4,257,770 and in European Patent Application Publications Nos. 0,028,787, 0,028,788, and 0,135,040 or can be prepared analogously to the procedures described there.

In formulae (2) and (3), the groups Y—$SO_2$— are preferably attached to the benzene moiety in the meta or para position relative to the azo groups. In formula (1), the group $MO_3S$— is preferably in the para positions relative to the group X or to the nitrogen atom of the formazan heterocycle.

In general, the dyes of formulae (1), (2) and (3) are present in the mixture according to the invention in a molar mixing ratio of 28:92:0.5 to 65:39:4, preferably in a molar mixing ratio of 37:79:2 to 56:52.5:1.

Examples of radicals of diazo components of formulae (2) and (3) are 3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl and 2,5-βdimethoxy-4-(β-sulfatoethylsulfonyl)phenyl and their vinylsulfonyl, β-chloroethylsulfonyl and β-thiosulfatoethylsulfonyl derivatives, preferably 2-methoxy-5-(β-sulfatoethylsulfonyl)phenyl and 2,5-dimethoxy-4-(β-sulfatoethylsulfonyl)phenyl and in particular 3-(β-sulfatoethylsulfonyl)phenyl and 4-(β-sulfatoethylsulfonyl)phenyl.

The dyes of the formulae (1), (2) and (3), in particular those containing the same chromophore, can possess, within the meaning of Y, different fiber-reactive groups —SO$_2$—Y. The dye mixtures can in particular contain dyes having the same chromophor in which the fiber-reactive groups —SO$_2$—Y are, on the one hand, vinylsulfonyl groups and, on the other, β-chloroethylsulfonyl or β-thiosulfatoethylsulfonyl or preferably β-sulfatoethylsulfonyl groups. If the dye mixtures contain such a dye component in the form of a vinylsulfonyl dye, the proportion of the corresponding vinylsulfonyl dye, relative to the corresponding β-chloro- or β-thiosulfato- or β-sulfatoethylsulfonyl dye, is preferably up to about 20 mol %, based on the corresponding dye chromophor. Of these, preference is given to those dye mixtures in which the molar ratio of the amount of vinylsulfonyl dyes to that of β-sulfatoethylsulfonyl dyes is between 2:98 and 10:90.

The dye mixtures according to the invention can be present as a preparation in solid or in liquid (dissolved) form. They usually contain the electrolyte salts customary for water-soluble and in particular fiber-reactive dyes, such as sodium chloride, potassium chloride and sodium sulfate, and can moreover contain the auxiliaries customary in commercial dyes, such as buffer substances which are capable of adjusting the pH in aqueous solution to a value between 3 and 7, such as sodium acetate, sodium borate, sodium bicarbonate, sodium dihydrogen phosphate and disodium hydrogen phosphate. If they are present in solid form, they may contain small amounts of siccatives or solubility-improving agents, such as the known condensation products of naphthalenesulfonic acid with formaldehyde, and if they are present in liquid form, such as in aqueous solution (including the content of thickening agents such as are customary in printing pastes), they may contain substances ensuring the durability of these preparations, such as, for example, mold-preventing agents.

In general, the dye mixtures according to the invention are present in the form of dye powders containing electrolyte salt and having a total dye content of 20 to 70% by weight, relative to the dye powder or the preparation. These dye powders/preparations can additionally contain the buffer substances mentioned in a total amount of up to 5% by weight, relative to the dye powder. If the dye mixtures according to the invention are present in aqueous solution, the total dye content in these aqueous solutions is up to 50% by weight, such as, for example, between 5 and 40% by weight, the electrolyte salt content in these aqueous solutions being preferably below 10% by weight, relative to the aqueous solution. The aqueous solutions (liquid preparations) can in general contain the buffer substances mentioned in an amount of up to 5% by weight, preferably of up to 2% by weight.

The dye mixtures according to the invention can be prepared in the usual manner, for example by mechanical mixing of the dyes or dye powders or their aqueous solutions. If the dye mixtures according to the invention are prepared by mechanical mixing of the dyes, any standardizing agents, dustproofing agents or further auxiliaries which may be necessary for mixing and are customary in dyeing technology and customary in dye preparations used for this purpose are added.

When starting from aqueous dye solutions of the individual components (individual dyes), the desired dye mixture is also obtained in aqueous form (liquid preparation) by simple mixing, taking into account the amounts of dye solutions and their dye concentrations. Such aqueous dye solutions of the individual components can also be synthesis solutions obtainable from the synthesis of the individual components. The aqueous solutions containing the dye mixtures according to the invention thus obtained by mixing the individual dye solutions (synthesis solutions) can then be used directly, if desired after filtration, concentration and/or addition of a buffer or other auxiliaries, for dyeing in the form of a liquid preparation. However, these dye solutions can also be converted into the pulverulent and granular dye mixtures according to the invention having the desired composition and modification, for example by spray-drying and, if required, in a fluidized bed.

The dye mixtures according to the invention and the dyes of formulae (1), (2) and (3) together produce blue dyeings exhibiting good color build-up and, in particular, good ability of unfixed portions of dye being washed out of the dyed material on hydroxy- and/or carboxamido-containing fiber materials by the application and fixation methods extensively described in the art of fiber-reactive dyes. Compared with the individual dyes, the dye mixture shows a homogeneous exhaustion and fixation behavior and produces blue dyeings having a constant hue not only at the beginning of the dyeing process but also towards the end of the dyeing process, which is particularly important in a continuous dyeing method. Accordingly, the dye mixture can also be used without problems in trichromatic dyeing.

Accordingly, the present invention also relates to the use of the dye mixtures according to the invention and of the dyes of the formulae (1), (2) and (3) together for dyeing (including printing and also in trichromatic dyeing) hydroxy- and/or carboxamido-containing fiber materials and to processes for dyeing such fiber materials with a dye mixture according to the invention or with the dyes of the formulae (1), (2) and (3) together by applying the dye mixture or these dyes in dissolved form to the substrate and fixing the dyes on the fiber by reaction with an alkaline agent or by means of heat or by both measures.

Hydroxy-containing materials are natural or synthetic hydroxy-containing materials, such as, for example, cellulose fiber materials, which may also be in the form of paper, or regenerated products thereof and polyvinyl alcohols. Cellulose fiber materials are preferably cotton, but also other vegetable fibers, such as linen, hemp, jute and ramie fibers. Examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon 6/6, nylon 6, nylon 11 and nylon 4.

The dye mixtures according to the invention are applied by generally known methods for the dyeing and printing of fiber materials in accordance with the known application methods for fiber-reactive dyes. Since the dyes of the dye mixtures according to the invention are highly compatible with one another, the dye mixtures according to the invention can also be used advantageously in exhaust dyeing methods. Accordingly, they produce dyeings in very high color yields in combination with excellent color build-up and constant hues, for example on cellulose fibers, by the exhaust method from a long liquor at temperatures between 40° and 105° C., if desired at temperatures of up to 130° C. under pressure, and, if desired, in the presence of customary dyeing assistants using acid scavengers and, if desired, neutral salts, such as sodium chloride or sodium sulfate. The procedure can be such that the warm bath is entered with the material and then gradually heated to the desired dyeing temperature, and the dyeing process is completed at this temperature. If desired, addition to the bath of the neutral salts which accelerate exhaustion of the dyes can be delayed until the actual dyeing temperature is reached.

Likewise, the customary printing methods for cellulose fibers, which can either be carried out in a single phase, for example by printing with a printing paste containing sodium bicarbonate or a different acid scavenger and the colorant, followed by steaming at 100° to 103° C., or in two phases, for example by printing with a neutral or weakly acidic printing paste containing the colorant, followed by fixing either by passing the printed goods through a hot electrolyte-containing alkaline bath or by overpadding with an alkaline electrolyte-containing padding liquor, followed by storing this treated material or by steaming or by a treatment with dry heat, produce strong prints having crisp contours and a clear white ground. Varying fixation conditions have only a slight effect on how the prints turn out. Not only in the dyehouses but also in the printing plants, the degrees of fixation obtained with the dye mixtures according to the invention are very high. When fixing is carried out by means of dry heat using the customary dry heat setting methods, hot air at 120° to 200° C. is used. Apart from the customary steam at 101° to 103° C., super-heated steam and pressurized steam having temperatures of up to 160° C. can also be used.

Examples of the agents acting as acid scavengers and resulting in fixation of the dyes on the cellulose fibers are water-soluble basic alkali metal salts and alkaline earth metal salts of inorganic or organic acids and also compounds releasing alkali in the heat. They include in particular alkali metal hydroxides and alkali metal salts of weak to medium-strong inorganic or organic acids, alkali metal compounds being preferably sodium compounds and potassium compounds. Examples of such acid scavengers are sodium hydroxide, potassium hydroxide, sodium carbonate, sodium bicarbonate, potassium carbonate, sodium formate, sodium dihydrogen phosphate and disodium hydrogen phosphate.

Treatment of the dyes of the dye mixtures according to the invention with acid scavengers, if appropriate with the application of heat, results in chemical bonding of the dyes to the cellulose fiber. In particular cellulose dyeings exhibit, after customary aftertreatment by rinsing to remove unfixed portions of dye, excellent wet fastness properties, especially since unfixed portions of dye can be easily washed out owing to their good cold water solubility.

The dyeings on polyurethane and polyamide fibers are usually carried out from an acid medium. Thus, to obtain the desired pH, it is possible to add, for example, acetic acid and/or ammonium sulfate and/or acetic acid and ammonium acetate or sodium acetate to the dyeing bath. To achieve a useful levelness of the dyeing, it is recommended to add customary leveling agents, such as, for example, those based on a cyanuric chloride adduct with 3 times the molar amount of an aminobenzenesulfonic acid or aminonaphthalenesulfonic acid or those based, for example, on a stearylamine adduct with ethylene oxide. Typically, the material to be dyed is introduced into the bath at a temperature of about 40° C., agitated therein for some time, the dyeing bath is then readjusted to the desired weakly acid, preferably weakly acetic acid, pH, and the actual dyeing is then carried out at a temperature between 60° and 98° C. However, the dyeings can also be carried out at the boiling temperature or at temperatures of up to 120° C. (under presssure).

The Examples below serve to illustrate the invention. Parts and percentages are by weight, unless stated otherwise. Parts by weight relate to parts by volume as the kilogramm relates to the liter.

If the formulae of the dyes are given in the Examples in the form of the free acid, the parts given relate to the acid form. However, the dyes are usually used as an alkali metal salt powder containing electrolyte salts (for example containing sodium chloride or sodium sulfate) which is the form customary for water-soluble dyes.

EXAMPLE 1

100 parts of an aqueous solution containing 43 parts of the dye of the formula (A)

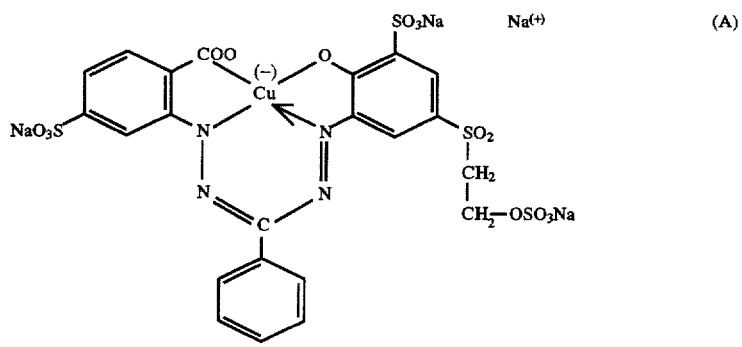

obtained from the synthesis of this dye after filtration are diluted in a reactor with 30 parts of water. A mixture of 70 parts of the dye of the formula (B) and 1 part of the dye of the formula (C)

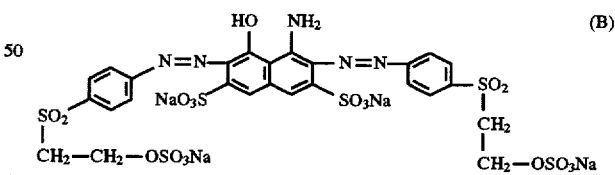

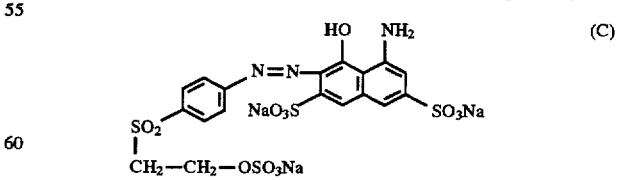

are then stirred into this solution in the form of an electrolyte-containing powder. The resulting aqueous dye mixture according to the invention can, if desired after addition of customary auxiliaries, such as, for example, buffer substances or synthetic materials, be used directly for dyeing or be converted into solid form by spray-drying and, if desired, granulation. When used for dyeing on the fiber materials mentioned in the description, such as, in particular, cellulose fiber materials such as cotton using the application methods customary in the art of fiber-reactive dyes, the dye mixture according to the invention shows a balanced exhaustion and fixation profile in combination with an excellent fastness level. It produces blue dyeings of good quality.

EXAMPLE 2

160 parts of an aqueous solution, such as, for example, an as-synthesized aqueous solution, containing 88 parts of the disazo dye of the formula (B) and 2 parts of the monoazo dye of the formula (C) are mixed with 120 parts of an aqueous solution, such as, for example, an as-synthesized aqueous solution, containing 43 parts of the copper formazan dye of the formula (A) with stirring (where these solutions can additionally contain electrolyte salts, such as sodium chloride, or customary auxiliaries, such as, for example, buffers and surface-active agents).

The resulting aqueous dye mixture according to the invention can be used directly for dyeing or be converted into solid form by spray-drying and, if desired, granulation. It produces strong, level blue dyeings and prints exhibiting good fastness properties, for example on cellulose fiber materials, by the application and fixation methods customary in the art of fiber-reactive dyes. The mixture is distinguished by a good exhaustion and fixation profile and produces blue dyeings of constant hue even when used in a continuous dyeing method.

EXAMPLE 3

86 parts of a dye powder of the dye of the formula (A) containing electrolyte salt (predominantly containing sodium chloride) and having a dye content of 50% and 200 parts of a powder of the dyes of the formulae (B) and (C) containing 47% of dye (B) and 3% of dye (C) and containing electrolyte salt are mixed mechanically with one another, it being possible to add to the dye powder another 0.5 to 2% of a buffer, such as, for example, sodium acetate or sodium dihydrogen phosphate/disodium hydrogen phosphate.

When used in the dyeing and printing methods customary in the art of fiber-reactive dyes, such as, for example, in an exhaust dyeing method, the resulting dye mixture according to the invention produces strong, highly level blue dyeings and prints, the hue of which is independent of the dyeing time.

EXAMPLES 4 to 39

In the Table Examples which follow, further dye mixtures according to the invention containing dyes of the formulae (A-1), (B-1) and (C-1) are described by means of their components and mixing ratios. They can be prepared in the usual manner by mixing the dyes such as, for example, by one of the variants described in Examples 1 to 3. The dye mixtures according to the invention produce highly level blue dyeings and prints by the dyeing and printing methods customary in the art of fiber-reactive dyes.

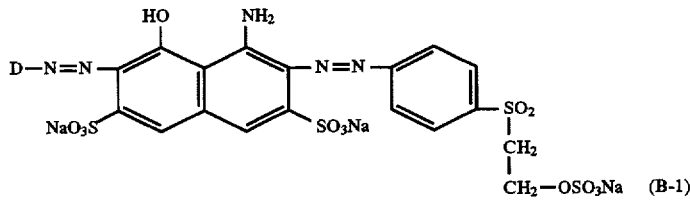

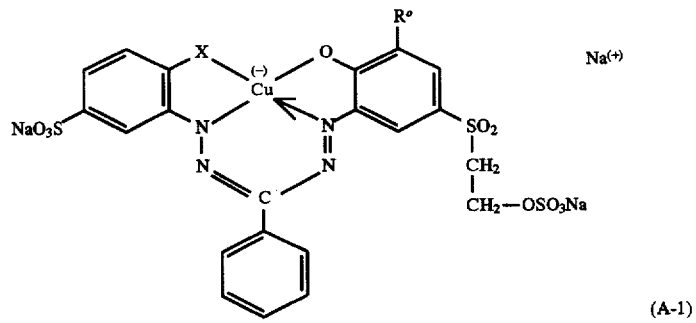

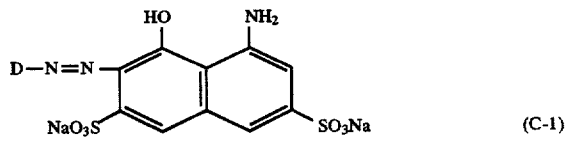

| Ex. | Dye (A-1) Radical R⁰ | Radical X | Dyes (B-1) and (C-1) Radical D | (A-1)/(B-1)/(C-1) Mixing ratio in parts |
|---|---|---|---|---|
| 4 | sulfo | carbonyloxy | 4-(β-sulfatoethylsulfonyl)phenyl | 43:85:1 |
| 5 | sulfo | carbonyloxy | " | 43:20.5:1 |
| 6 | sulfo | carbonyloxy | 2,5-dimethoxy-4-(β-sulfatoethyl-sulfonyl)phenyl | 43:49:1.5 |

-continued

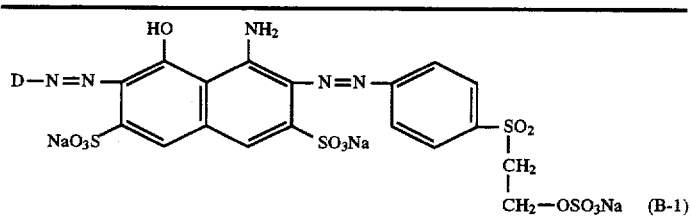
(B-1)

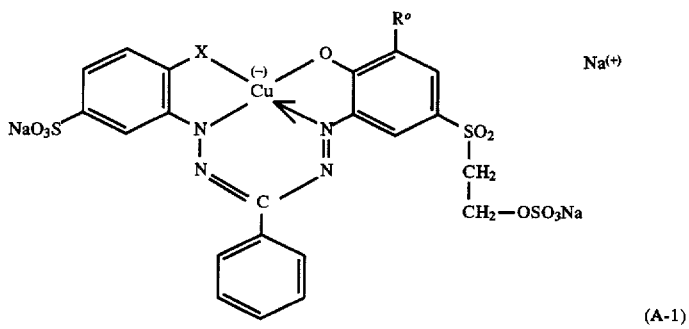
(A-1)

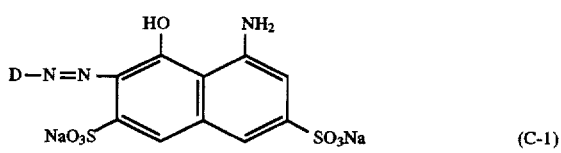
(C-1)

|  | Dye (A-1) | | Dyes (B-1) and (C-1) | (A-1)/(B-1)/(C-1) |
|---|---|---|---|---|
| Ex. | Radical R⁰ | Radical X | Radical D | Mixing ratio in parts |
| 7 | sulfo | carbonyloxy | 2,5-dimethoxy-4-(β-sulfatoethyl-sulfonyl)phenyl | 43:63:2 |
| 8 | sulfo | carbonyloxy | 2,5-dimethoxy-4-(β-sulfatoethyl-sulfonyl)phenyl | 43:99:2 |
| 9 | sulfo | carbonyloxy | 2,5-dimethoxy-4-(β-sulfatoethyl-sulfonyl)phenyl | 43:36:0.5 |
| 10 | sulfo | carbonyloxy | 2-methoxy-5-(β-sulfatoethyl-sulfonyl)phenyl | 43:44:1 |
| 11 | sulfo | carbonyloxy | 2-methoxy-5-(β-sulfatoethyl-sulfonyl)phenyl | 43:48:2 |
| 12 | sulfo | carbonyloxy | 2-methoxy-5-(β-sulfatoethyl-sulfonyl)phenyl | 43:84:2 |
| 13 | sulfo | carbonyloxy | 2-methoxy-5-(β-sulfatoethyl-sulfonyl)phenyl | 43:21:0.5 |
| 14 | hydrogen | carbonyloxy | 4-(β-sulfatoethylsulfonyl)phenyl | 43:35:0.5 |
| 15 | hydrogen | carbonyloxy | " | 43:44:1 |
| 16 | hydrogen | carbonyloxy | " | 43:48:2 |
| 17 | hydrogen | carbonyloxy | 4-(β-sulfatoethylsulfonyl)phenyl | 43:85:1 |
| 18 | hydrogen | carbonyloxy | " | 43:20.5:1 |
| 19 | hydrogen | carbonyloxy | 2,5-dimethoxy-4-(β-sulfatoethyl-sulfonyl)phenyl | 43:49:1.5 |
| 20 | hydrogen | carbonyloxy | 2,5-dimethoxy-4-(β-sulfatoethyl-sulfonyl)phenyl | 43:63:2 |
| 21 | hydrogen | carbonyloxy | 2,5-dimethoxy-4-(β-sulfatoethyl-sulfonyl)phenyl | 43:99:2 |
| 22 | hydrogen | carbonyloxy | 2,5-dimethoxy-4-(β-sulfatoethyl-sulfonyl)phenyl | 43:36:0.5 |
| 23 | hydrogen | carbonyloxy | 2-methoxy-5-(β-sulfatoethyl-sulfonyl)phenyl | 43:44:1 |
| 24 | hydrogen | carbonyloxy | 2-methoxy-5-(β-sulfatoethyl-sulfonyl)phenyl | 43:48:2 |
| 25 | hydrogen | carbonyloxy | 2-methoxy-5-(β-sulfatoethyl-sulfonyl)phenyl | 43:84:2 |
| 26 | hydrogen | carbonyloxy | 2-methoxy-5-(β-sulfatoethyl-sulfonyl)phenyl | 43:21:0.5 |
| 27 | sulfo | oxy | 4-(β-sulfatoethylsulfonyl)phenyl | 43:35:0.5 |
| 28 | sulfo | oxy | " | 43:44:1 |
| 29 | sulfo | oxy | " | 43:48:2 |
| 30 | sulfo | oxy | 4-(β-sulfatoethylsulfonyl)phenyl | 43:85:1 |
| 31 | sulfo | oxy | " | 43:20.5:1 |
| 32 | sulfo | oxy | 2,5-dimethoxy-4-(β-sulfatoethyl-sulfonyl)phenyl | 43:49:1.5 |
| 33 | sulfo | oxy | 2,5-dimethoxy-4-(β-sulfatoethyl- | 43:63:2 |

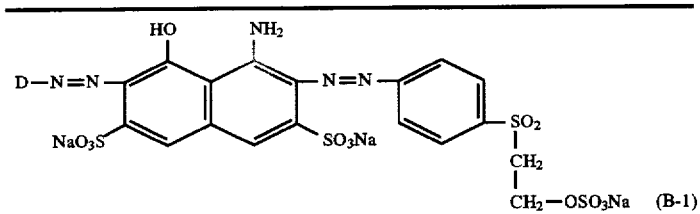

(B-1)

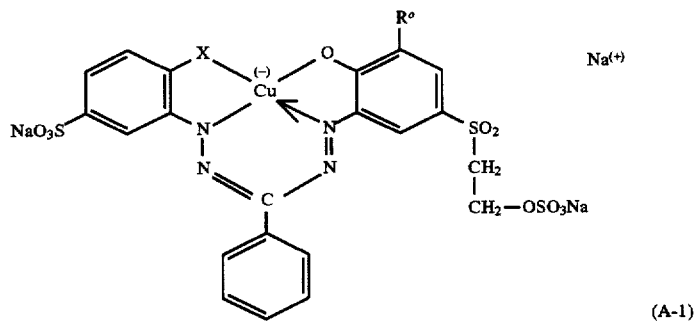

(A-1)

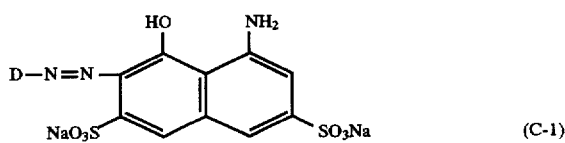

(C-1)

| | Dye (A-1) | | Dyes (B-1) and (C-1) | (A-1)/(B-1)/(C-1) |
|---|---|---|---|---|
| Ex. | Radical R° | Radical X | Radical D | Mixing ratio in parts |
| 34 | sulfo | oxy | 2,5-dimethoxy-4-(β-sulfatoethyl-sulfonyl)phenyl | 43:99:2 |
| 35 | sulfo | oxy | 2,5-dimethoxy-4-(β-sulfatoethyl-sulfonyl)phenyl | 43:36:0.5 |
| 36 | sulfo | oxy | 2-methoxy-5-(β-sulfatoethyl-sulfonyl)phenyl | 43:44:1 |
| 37 | sulfo | oxy | 2-methoxy-5-(β-sulfatoethyl-sulfonyl)phenyl | 43:48:2 |
| 38 | sulfo | oxy | 2-methoxy-5-(β-sulfatoethyl-sulfonyl)phenyl | 43:84:2 |
| 39 | sulfo | oxy | 2-methoxy-5-(β-sulfatoethyl-sulfonyl)phenyl | 43:21:0.5 |

We claim:

1. A dye mixture containing one or more copper formazan dyes of the formula (1), one or more disazo dyes of the formula (2), and one or two monoazo dyes of the formula (3):

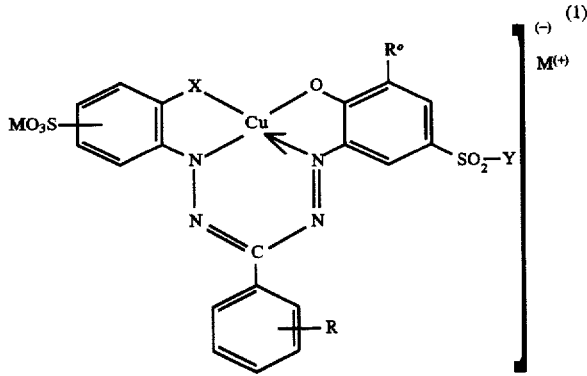

(1)

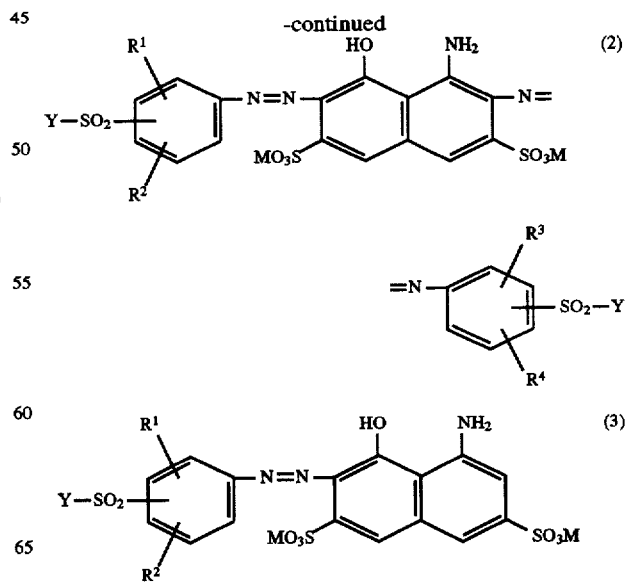

(2)

(3)

in which $R^0$ is hydrogen or sulfo,

Y is vinyl, β-chloroethyl, β-thiosulfatoethy or β-sulfatoethyl,

R is hydrogen, alkyl of 1 to 4 carbon atoms, sulfo, carboxy, alkanoyl of 2 to 5 carbon atoms or a group of the formula —SO$_2$—Y where Y has one of the meanings given above, X is carbonyloxy of the formula —CO—O— or oxy of the formula —O— or is the group —SO$_3^{(-)}$, M is hydrogen or an alkali metal, $R^1$ is hydrogen, methyl, ethyl, methoxy or ethoxy, $R^2$ is hydrogen, methyl, ethyl, methoxy or ethoxy, $R^3$ is hydrogen, methyl, ethyl, methoxy or ethoxy, $R^4$ is hydrogen, methyl, ethyl, methoxy or ethoxy.

2. A dye mixture as claimed in claim 1, wherein $R^1$ and $R^3$, independently of one another, are each methoxy or hydrogen and $R^2$ and $R^4$ are each hydrogen.

3. A dye mixture as claimed in claim 1, wherein the dyes of the formulae (1), (2) and (3) are present in the mixture in a molar mixing ratio of 28:92:0.5 to 65:39:4.

4. A dye mixture as claimed in claim 1, wherein the dyes of the formulae (1), (2) and (3) are present in the mixture in a molar mixing ratio of 37:79:2 to 56:52.5:1.

5. A dye mixture as claimed in claim 2, wherein the dyes of the formulae (1), (2) and (3) are present in the mixture in a molar mixing ratio of 28:92:0.5 to 65:39:4.

6. A dye mixture as claimed in claim 2, wherein the dyes of the formulae (1), (2) and (3) are present in the mixture in a molar mixing ratio of 37:79:2 to 56:52.5:1.

7. A dye mixture as claimed in claim 1, wherein each Y, independently of the others, is vinyl or β-sulfatoethyl.

* * * * *